(12) United States Patent
Dettling et al.

(10) Patent No.: US 11,181,889 B2
(45) Date of Patent: Nov. 23, 2021

(54) METHOD FOR OPERATING AT LEAST ONE MACHINING APPARATUS AND MACHINING SYSTEM

(71) Applicant: HOMAG GmbH, Schopfloch (DE)

(72) Inventors: Peter Dettling, Horb (DE); Florian Broghammer, Boesingen (DE)

(73) Assignee: Homag GmbH, Schopfloch (DE)

( * ) Notice: Subject to any disclaimer, the term of this patent is extended or adjusted under 35 U.S.C. 154(b) by 158 days.

(21) Appl. No.: 16/166,014

(22) Filed: Oct. 19, 2018

(65) Prior Publication Data

US 2019/0121326 A1 Apr. 25, 2019

(30) Foreign Application Priority Data

Oct. 20, 2017 (DE) .......................... 102017124536.7

(51) Int. Cl.
| | |
|---|---|
| *B27C 5/00* | (2006.01) |
| *G05B 19/4155* | (2006.01) |
| *B23Q 15/02* | (2006.01) |
| *B23Q 17/22* | (2006.01) |
| *B23Q 15/22* | (2006.01) |
| *B23Q 3/155* | (2006.01) |
| *B23Q 17/00* | (2006.01) |
| *B23Q 7/00* | (2006.01) |
| *G05B 19/404* | (2006.01) |
| *B23C 3/24* | (2006.01) |
| *G05B 19/401* | (2006.01) |

(52) U.S. Cl.
CPC ............ *G05B 19/4155* (2013.01); *B23C 3/24* (2013.01); *B23Q 3/155* (2013.01); *B23Q 7/00* (2013.01); *B23Q 15/02* (2013.01); *B23Q 15/22* (2013.01); *B23Q 17/00* (2013.01); *B23Q 17/22* (2013.01); *B27C 5/00* (2013.01); *G05B 19/404* (2013.01); *G05B 19/401* (2013.01); *G05B 2219/36088* (2013.01)

(58) Field of Classification Search
CPC ....... B27C 5/00; B27M 3/002; B27M 3/0026; B27M 3/006; B27M 1/00; B26D 5/00; B26D 5/007; B23Q 15/007; B23Q 15/02; B23Q 15/04; B23Q 15/06; B23Q 15/14; B23Q 15/22; B23Q 2717/00; B23Q 2717/006; B23Q 17/22; B23Q 17/2233; B23Q 17/2414
USPC .......................... 144/387, 392, 398, 402, 421
See application file for complete search history.

(56) References Cited

U.S. PATENT DOCUMENTS 7,853,349 B2 * 12/2010 Barker ................. B23D 45/105
                                                144/374
9,505,072 B2 * 11/2016 Barker ..................... B27B 1/007
(Continued)

FOREIGN PATENT DOCUMENTS

CN     101274377 A    10/2008
CN     201432336 Y     3/2010
(Continued)

*Primary Examiner* — Matthew Katcoff
(74) *Attorney, Agent, or Firm* — Morgan, Lewis & Bockius LLP

(57) ABSTRACT

The invention relates to a method for operating at least one machining apparatus as well as a machining system with at least one machining apparatus. Such a machining apparatus can be a machining apparatus for machining workpieces, in particular panel-shaped workpieces, which are used, for example, in the furniture and component industry.

12 Claims, 3 Drawing Sheets

(56) References Cited

U.S. PATENT DOCUMENTS

| | | | |
|---|---|---|---|
| 9,659,363 B2 * | 5/2017 | Ogawa | ................ B23Q 15/22 |
| 2004/0049312 A1 | 3/2004 | Bender | |
| 2006/0219071 A1 * | 10/2006 | Pobuda | ................ B27B 31/06 |
| | | | 83/42 |
| 2007/0193012 A1 | 8/2007 | Bergman et al. | |
| 2011/0308966 A1 | 12/2011 | Secherling et al. | |
| 2013/0199672 A1 | 8/2013 | Barker | |

FOREIGN PATENT DOCUMENTS

| | | |
|---|---|---|
| CN | 101850440 A | 10/2010 |
| CN | 103846974 A | 6/2014 |
| CN | 104321484 A | 1/2015 |
| CN | 105522620 A | 4/2016 |
| DE | 210749 | 6/1984 |
| DE | 10241742 | 3/2004 |
| DE | 102005045748 A1 | 4/2007 |
| DE | 102007003891 | 7/2008 |
| DE | 102007008699 | 8/2008 |
| DE | 102010013594 | 10/2011 |
| DE | 102010024084 | 12/2011 |
| DE | 102010047137 A1 | 4/2012 |
| WO | WO-2008113807 A2 | 9/2008 |

* cited by examiner

METHOD FOR OPERATING AT LEAST ONE MACHINING APPARATUS AND MACHINING SYSTEM

TECHNICAL FIELD

The present invention relates to a method for operating at least one machining apparatus as well as a machining system with at least one machining apparatus.

Such a machining apparatus can be a machining apparatus for machining workpieces, in particular panel-shaped workpieces, which are used, for example, in the furniture and component industry.

PRIOR ART

Owing to the precision required for the machining of workpieces and the dimensions of the machining systems used therefor, the set-up for such a machining system usually requires several hours of set-up time until manufacturing can be started. A set-up process of this kind comprises, inter alia, the setting of individual machining units of the machining apparatus of the machining system. These have to be adjusted to each other to guarantee an optimum machining result.

The complexity of the set-up process is caused by the empirical adjustment of a plurality of machining units jointly contributing to the machining result by each providing partial or intermediate results. Further conditions also render the set-up process more difficult such that generally a relatively long starting phase must be assumed. For example, a certain amount of time is required before the machining system works at a stable temperature, where the course of the temperature of the machining apparatus, in particular the engines or the driving apparatus of the machining units, or the tools per se, are adjusted to a particular range. Moreover, the impact of the material of the respective workpiece, arising due to there being batches, and the tool wear have an impact on the dimensional accuracy and therefore on the qualitative machining result on the workpiece.

The relatively complex setting process and the subsequent monitoring of the machining apparatus or machining system thus very often depend on subjective aspects of the respective user such that an optimally set result is not necessarily reproducible.

A plurality of measures are already known in the prior art, with which workpieces of wood or wood materials can be evaluated as to quality.

For example, DE 10 2010 047 137 A1 shows a method for monitoring the manufacturing of locking and laying profiles of floor, wall or ceiling panels, in particular laminate or direct printing panels, with at least one laser for illumination of the profile and at least one camera for capturing the illuminated profile, the method comprising the following steps: First, a horizontal and a vertical reference edge of the profile are determined. Subsequently, the actual position of at least one test point on the profile is determined with the help of the reference edges, and the actual state is compared to a target state, with the panel being moved in relation to the at least one laser and the at least one camera, and the reference edges being newly determined with each measuring.

Furthermore, DE 10 2005 045 748 A1 is known, showing a measuring apparatus for measuring a workpiece. In one embodiment example, a conveying apparatus is provided for the workpiece, with the measuring apparatus, formed each of a lighting unit and a camera, being provided opposite to the workpiece. The image data captured by the two cameras are processed by a joint image processing system and optically displayed on a monitor. The light line generated by the respective lighting unit is projected laterally via a deflecting mirror onto the workpiece and the conveying apparatus to generate a triangulation angle. To detect the conveying apparatus, the conveying apparatus comprises a first and a second reference surface also opposite in the region of the respective measuring apparatus, the respective distance between the partial surface and the reference surface being ascertainable by means of the triangulation method.

However, said measuring apparatus are only used for quality monitoring and thus the problem is not solved that a plurality of machining units are to be set according to the experience of a respective user. Moreover, said methods have the disadvantage that undercuts of the profile cannot be recognized since these are covered by other areas of the profile. Furthermore, the orientation of the cameras in said documents results in so-called parallax errors occurring when determining the position of the contour. There is thus not a direct geometrical relation of the measured results to the actual contour of the profile.

Furthermore, an active correction of errors is not described. The known systems are only able to determine deviations relative to a fixed and taught point and to derive an error state from this.

Subject Matter of the Invention

An object of the present invention is to provide a method for operating at least one machining apparatus with which high-quality manufacturing and increased performance is made possible and/or with which the service life of a machining apparatus is increased.

The subject matter of claim 1 provides a respective method. Further preferred embodiments are presented in the dependent claims. The present invention further relates to a machining system with at least one machining apparatus. Features of the method claims can be combined with those of the machining system and vice versa.

The method for operating at least one machining apparatus comprises the steps of:
- machining a first workpiece with a plurality of machining units such that the workpiece has a profile at least in portions,
- determining an actual profile geometry of the machined workpiece,
- comparing the actual profile geometry with a target profile geometry,
- and, if a deviation of the actual profile geometry over the target profile geometry is determined, outputting at least a corrective value for at least one of the machining units.

It is preferred that the steps be executed in said sequence.

The machining apparatus is preferably configured to machine or process a workpiece of wood, wood material, composite material or the like.

The invention has the advantage that a deviation from a target profile geometry can be precisely determined and measures can be derived therefrom. For example, damage to the profile geometry by a defective tool edge or the like can be reliably detected.

"Profile geometry" means one or more dimensions of a profile provided on a workpiece. The profile is in particular determined in a side view or sectional view of a portion of the workpiece. For example, the profile can be a click profile of a wood panel. The corrective value can be used to affect a machining unit or a plurality thereof, to exchange a tool and/or to change the conveying speed for moving the workpiece.

The corrective value for at least one of the machining units can cause a direct impact on the machining unit. Alternatively, it is possible to display the corrective value, possibly with further information, such that a user can carry out a user operation on the machining unit.

It is preferred that the actual profile geometry and/or the target profile geometry comprise at least one length, preferably a plurality of lengths, and/or at least one angle, preferably a plurality of angles, of the profile. The profile can be a recess or a protrusion, for example, preferably with at least one undercut.

According to one embodiment, it is provided that partial corrective values for a respective machining unit are determined as a corrective value after determining a deviation between the actual profile geometry and the target profile geometry, and that the respective partial corrective value is output to the respective machining unit. It can thus be determined that a greater relative setting must be undertaken on one specific machining unit than on another machining unit.

It is preferred that the at least one corrective value comprises a displacement movement of one of the machining units in at least one translational direction and/or at least one rotational direction, preferably in a plurality of translational and/or rotational directions. A zero position of the machining unit can thus be reset, for example.

It is provided in one embodiment that the method is carried out, in particular sporadically, cyclically or continuously, during a manufacturing process or that the method is carried out during a set-up process. If the method is carried out during a manufacturing process, the method can be used to obtain a high quality of products as consistent as possible.

The determination of the actual profile geometry is preferably undertaken by at least one contactless measuring apparatus, in particular a camera, a laser and/or an ultrasonic measuring apparatus, the determination of the actual profile geometry being further preferably carried out by means of an impinging light method or transmitted light method from one side of the profile. In this manner, it can be ensured that the process sequence is as smooth as possible.

According to one embodiment, determination of the actual profile geometry is carried out with the method by means of a measuring apparatus comprising one or a plurality of contact sensors. A contact sensor is configured to be relatively robust and is thus hardly affected by a possibly dusty environment.

It can be preferable with this method that a further (second) workpiece is machined after a corrective value is output and the step of determining an actual profile geometry and comparing the actual profile geometry with a target profile geometry is repeated. These steps can be repeated until the ascertained actual profile geometry is within the tolerance range and manufacturing according to high quality requirements is thus ensured.

Furthermore, the machining of the workpiece can comprise a machining process, in particular a milling process, a drilling process, a grinding process or a combination thereof. Such a machining can be used, in particular, for the machining of a workpiece of wood or wood materials.

According to a further embodiment, it is provided that a plurality of machining apparatus of a machining system can be operated with this method. Individual work steps of different machining apparatus can thus be adjusted to each other, thereby increasing the product quality.

The invention furthermore relates to a machining system with the features according to claim 12. The machining system is in particular configured to carry out the method according to one of the preceding aspects or according to one of claims 1 to 11. Further preferred embodiments are presented in the dependent apparatus claims.

The invention further relates to the use of the machining system for carrying out the method according to one of the aforementioned aspects or according to one of claims 1 to 11.

DETAILED DESCRIPTION OF THE PREFERRED EMBODIMENT

On the basis of the enclosed figures, the invention will be described more clearly below, with the subsequent explanations not to be viewed as being restrictive.

Features which are shown in connection with the following description can be used in the method according to the invention as well as the machining system according to the invention. Modifications of such features can be combined each with other features of the described embodiment to form further embodiments of the present invention.

Figure 1:
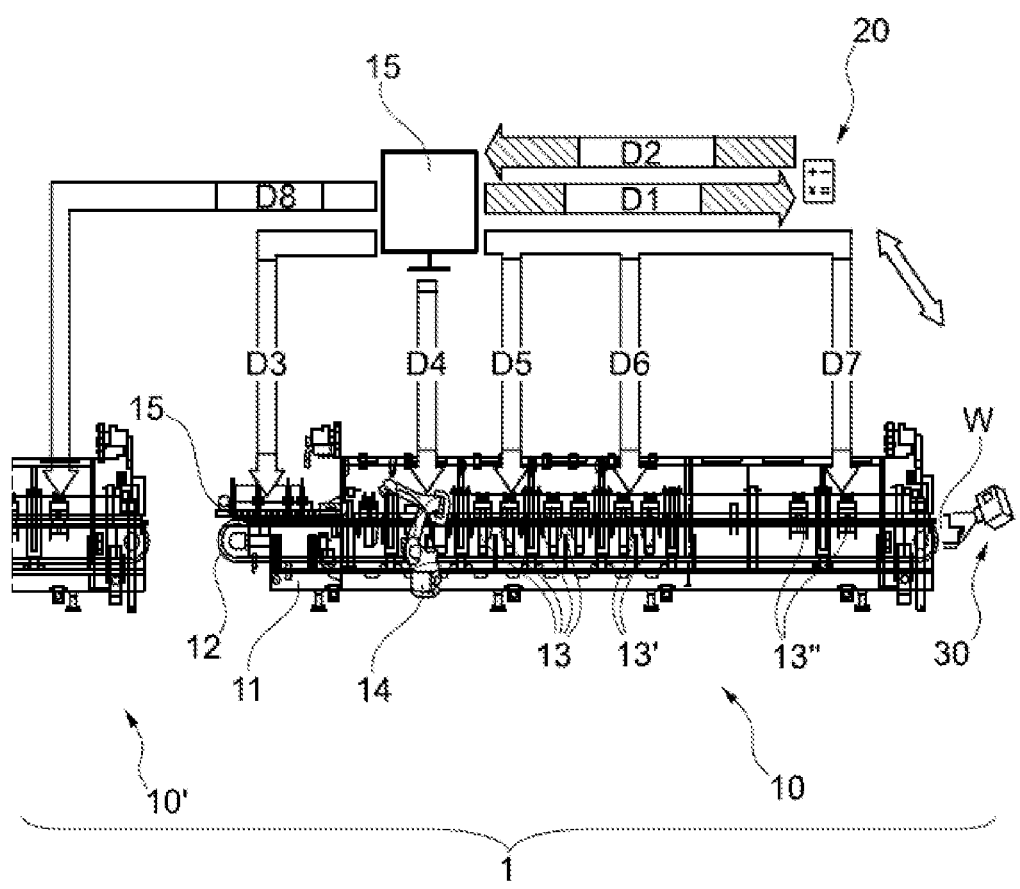
FIG. 1 is a schematic view of a machining system with a plurality of machining apparatus.

Using a schematic drawing, a machining system 1 is shown in FIG. 1. The machining system 1 comprises a first machining apparatus 10 as well as a second machining apparatus 10'. In the conveying direction of a workpiece, the first machining apparatus 10 is arranged subsequent to the second machining unit 10'. A workpiece can be transferred manually or mechanically from one machining apparatus to another.

Further machining apparatus can be provided in the machining system 1. Only the first machining apparatus 10 will be described in detail below in order to clearly describe the invention. Similar or other details can be provided in the second machining apparatus 10' or in a further machining apparatus.

The first machining apparatus 10 comprises a machine bed 11 which extends along the conveying direction. To move the workpieces in the conveying direction, a conveying apparatus 12 is provided in the present embodiment example, which is configured, for example, as a chain belt conveyor or belt conveyor.

A plurality of machining units 13, 13', 13" are arranged along the conveying path of the first machining apparatus, which can carry out various machining processes on a workpiece moved by the conveying apparatus 12. In particular, in several steps recesses are made, inter alia, on a narrow side of a workpiece W to form a profile on workpiece W. A workpiece machined in such a manner can be, for example, a parquet panel with a click profile or a similar profile.

The first machining apparatus 10 further comprises a tool changer 14 which is configured as a robot in the present embodiment example. The tool changer 14 can change a tool on one or a plurality of machining units 13, 13', 13".

A measuring apparatus 30 that will be subsequently explained in more detail is provided in an outlet region of the machining apparatus 10. An actual profile geometry of a machined workpiece is detected by the measuring apparatus 30.

The machining system 1 further comprises a control apparatus 15. A main control 20 is moreover provided, which communicates with the control apparatus 15. The communication between the control apparatus 15, the control 20 and/or units of the machining apparatus 10 can take place wirelessly or via cable.

Data relating to the machining units or tools used in the first machining apparatus 10 are determined by the control apparatus 15 or these data are input manually. Moreover, the data relating to the workpiece geometry of a workpiece to be machined are determined or input manually.

These data are transferred to the main control 20 (D1). The main control 20 communicates with the measuring apparatus 30. The measuring apparatus 30 determines an actual profile geometry of a machined workpiece which was, for example, machined as a test workpiece during a set-up process. Alternatively, it can also be a workpiece which will have to be evaluated during a manufacturing process of the machining apparatus 10.

The main control 20 compares the present values of the target profile geometry with the actual profile geometry determined by the measuring apparatus 30. If a deviation is ascertained, the respective data are transmitted to the control apparatus 15.

The control apparatus 15 determines measures for controlling the machining units or, optionally, a tool changer from the data received (D2). In this regard, the described control options are to be understood as examples.

In particular, a width change at the feeding ruler can be influenced (D3). Furthermore, it can be communicated to the tool changer 14 that there is a defect tool at a particular machining unit and that this tool is to be replaced (D4). The control apparatus 15 can also cause the machining units 13, 13', 13" to be affected to change the position thereof in a translational and/or rotational direction. Each of the machining units 13, 13', 13" can comprise different axes which can be affected. Four-axis, five-axis and six-axis units must be mentioned in particular, which can be combined in the first machining apparatus 10.

Figure 2A:
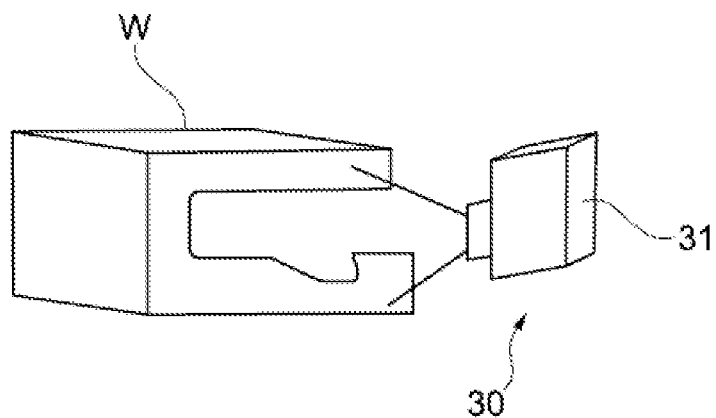
FIG. 2a shows a measuring method which can be used in the method according to the invention or the machining system according to the invention.

In FIG. 2a, an example of a measuring apparatus 30 is shown, which carries out an optical determination of a profile geometry of a workpiece. A measuring sensor 31 is used which comprises a laser and a camera in order to scan the profile of a workpiece and accordingly determine profile geometry data.

Figure 2B:
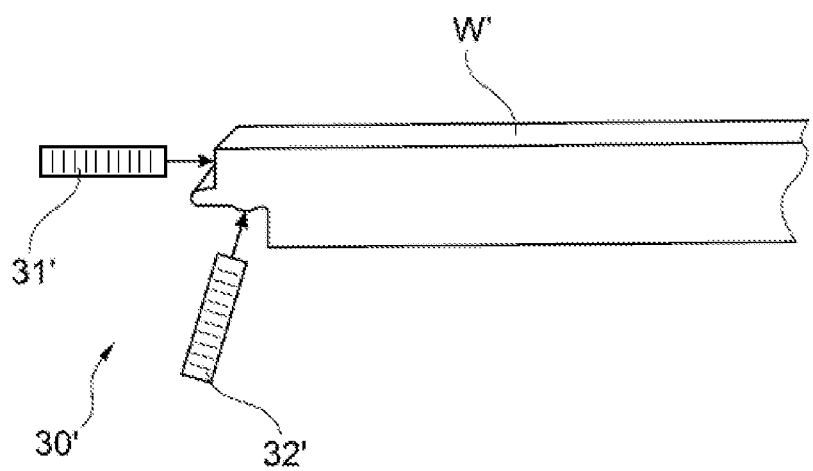
FIG. 2b shows an alternative measuring method which can be used in the method according to the invention or the machining system according to the invention.

In FIG. 2b, an alternative embodiment of a measuring apparatus 30' is shown, which comprises a plurality of contact sensors 31', 32' (tactile sensors). The contact sensors 31', 32' come into contact with specific portions of the profile of the workpiece W' and determine profile data.

According to a further embodiment, a contactless measuring sensor and a contact sensor can be combined in a measuring apparatus to determine a profile geometry of a workpiece.

Figure 3:
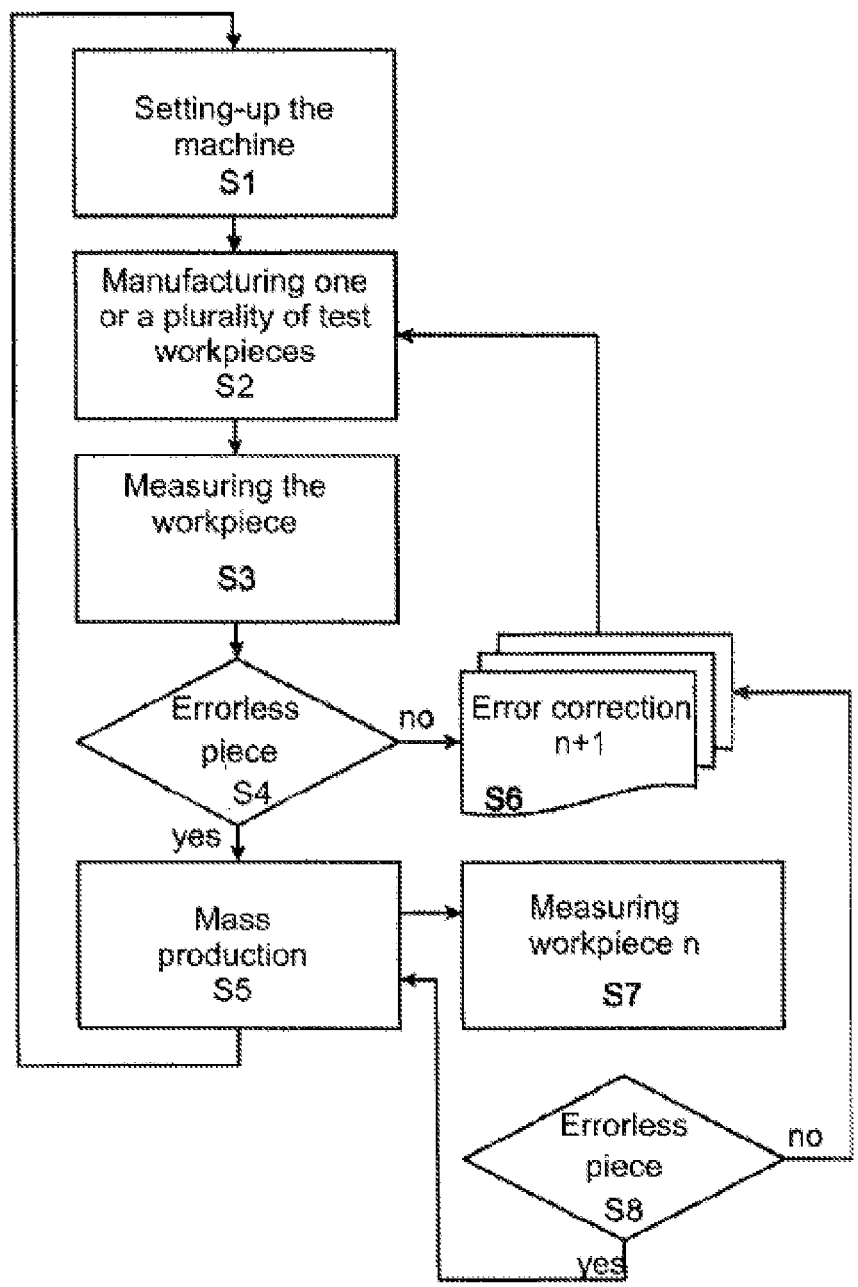
FIG. 3 shows a process sequence to illustrate the method according to the invention and the machining system according to the invention.

In FIG. 3, an example of a process sequence is shown, with the process in the present embodiment example consisting of a portion for determining a profile geometry when setting-up the machining apparatus 10 and a portion for determining a profile geometry during an ongoing manufacturing process as part of quality monitoring. Said procedural steps can also be applied individually.

First, the machining apparatus 10 is set-up (step S1). In this regard, the machining units 13, 13', 13" are equipped, for example, with specific tools and the machining units are adjusted for machining. This adjustment of the machining units can relate, for example, to basic positions of the machining units.

A test workpiece is thereafter manufactured with a machining apparatus prepared in such a manner (step S2).

The workpiece manufactured such is now evaluated by the measuring apparatus (30 or 30') and the actual profile geometry of the workpiece is determined during this.

The main control 20 decides in a subsequent method step (step S4) whether the workpiece was manufactured without errors. This means that the determined actual profile geometry lies within a tolerance range in relation to the target profile geometry.

If it is determined in step S4 that the actual profile geometry is within the tolerance range of the target profile geometry (YES in step S4), the conventional manufacturing process (the mass production) can be started (step S5).

However, if it is determined in step S4 that the actual profile geometry deviates from the target profile geometry beyond the fixed tolerance range (NO in step S4), an error correction is undertaken (step S6). A test workpiece is again manufactured thereafter (step S2).

If, as described previously, the mass production is started (step S5), a workpiece can be measured (step S7) during the mass production in order to determine the respective actual profile geometry.

The main control 20 decides on the basis of the measuring results of the measuring apparatus 30, 30' whether the workpiece was manufactured within the tolerance range (step S8). If this is not the case (NO in step S8), an error correction is undertaken with step S6. This can furthermore require that a test workpiece must be manufactured again (step S2).

However, if it is determined in step S8 that the workpiece was manufactured such that the actual profile geometry is within a tolerance range of the target profile geometry (YES in step S8), mass production is continued.

The invention claimed is:

1. A method for operating at least one machining apparatus, the method comprising:
   machining a workpiece with a plurality of machining units such that the workpiece has a profile;
   determining an actual profile geometry of the machined workpiece;
   comparing the actual profile geometry to a target profile geometry; and
   if a deviation of the actual profile geometry over the target profile geometry is determined, determining partial corrective values individually for two or more of the plurality of machining units; and
   outputting the partial corrective values for two or more of the plurality of machining units, wherein the two or more of the plurality of machine units are each adjusted individually based on respective partial corrective values, to collectively contribute in attaining a desired machining result.

2. The method according to claim 1, wherein the actual profile geometry and the target profile geometry comprise at least one length and at least one angle of the profile.

3. The method according to claim 1, wherein the at least adjustment of the two or more of the plurality of machine units based on respective partial corrective values causes a displacement movement of the two or more of the plurality of machine units in at least one translational direction and at least one rotational direction.

4. The method according to claim 1, wherein the method is carried out during a manufacturing process or the method is carried out during a set-up process.

5. The method according to claim 1, wherein the determination of the actual profile geometry is undertaken by means of at least one contactless measuring apparatus, the determination of the actual profile geometry being carried out by means of an impinging light method or transmitted light method from one side of the profile.

6. The method according to claim 1, wherein the determination of the actual profile geometry is carried out by means of a measuring apparatus comprising one or a plurality of contact sensors.

7. The method according to claim 1, wherein after outputting the partial corrective values, at least one further workpiece is machined, and the step of determining an actual profile geometry and the step of comparing the actual profile geometry to a target profile geometry are repeated.

8. The method according to claim 1, wherein the machining of the workpiece comprises a machining process.

9. The method according to claim 1, wherein a plurality of machining apparatus of a machining system are operated with the method.

10. The method according to claim 4, wherein the method is carried out sporadically, cyclically or continuously.

11. The method according to claim 5, wherein the at least one contactless measuring apparatus comprises a camera, a laser, an ultrasonic measuring apparatus, or a combination thereof.

12. The method according to claim 8, wherein the machining process comprises a milling process, a drilling process, a grinding process, or a combination thereof.

* * * * *